(12) United States Patent
Tagawa et al.

(10) Patent No.: US 7,715,625 B2
(45) Date of Patent: May 11, 2010

(54) IMAGE PROCESSING DEVICE, IMAGE PROCESSING METHOD, AND STORAGE MEDIUM STORING PROGRAM THEREFOR

(75) Inventors: Masatoshi Tagawa, Ebina (JP); Michihiro Tamune, Ashigarakami-gun (JP); Shaoming Liu, Ashigarakami-gun (JP); Hiroshi Masuichi, Ashigarakami-gun (JP); Kiyoshi Tashiro, Kawasaki (JP); Kyosuke Ishikawa, Minato-ku (JP); Atsushi Itoh, Ashigarakami-gun (JP); Naoko Sato, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1351 days.

(21) Appl. No.: 11/080,630

(22) Filed: Mar. 16, 2005

(65) Prior Publication Data

US 2005/0232484 A1   Oct. 20, 2005

(30) Foreign Application Priority Data

Apr. 1, 2004   (JP) ............... 2004-109031

(51) Int. Cl.
- *G06K 9/34* (2006.01)
- *G06K 9/78* (2006.01)
- *G06K 9/46* (2006.01)
- *G06F 17/30* (2006.01)
- *H04N 1/00* (2006.01)

(52) U.S. Cl. .............. 382/173; 707/E17.022; 707/E17.039; 382/176; 382/190; 358/403; 358/462

(58) Field of Classification Search ............. 382/167, 382/173, 176, 190; 358/403, 462; 707/104.1
See application file for complete search history.

(56) References Cited

U.S. PATENT DOCUMENTS

| | | | | | |
|---|---|---|---|---|---|
| 5,319,745 | A | * | 6/1994 | Vinsonneau et al. | ......... 715/234 |
| 5,619,594 | A | * | 4/1997 | Melen | ......... 382/233 |
| 5,671,067 | A | * | 9/1997 | Negishi et al. | ......... 358/403 |
| 7,469,365 | B2 | | 12/2008 | Kawahara et al. | |
| 2002/0154816 | A1 | * | 10/2002 | Gay | ......... 382/190 |
| 2004/0019585 | A1 | | 1/2004 | Fujimoto et al. | |

FOREIGN PATENT DOCUMENTS

| | | |
|---|---|---|
| CN | 1471036 A | 1/2004 |
| JP | A 01-266689 | 10/1989 |
| JP | A 09-091450 | 4/1997 |
| JP | A 10-063674 | 3/1998 |
| JP | A 10-228473 | 8/1998 |
| JP | A 2000-048041 | 2/2000 |
| JP | A 2001-094711 | 4/2001 |
| JP | A 2002-091944 | 3/2002 |

* cited by examiner

*Primary Examiner*—Bhavesh M Mehta
*Assistant Examiner*—Stephen R Koziol
(74) *Attorney, Agent, or Firm*—Oliff & Berridge, PLC (57) ABSTRACT

A image processing device has a reading unit, a graphics area extraction unit, a writing area extraction unit, a character string extraction unit and an association unit. The reading unit reads a document. The graphics area extraction unit extracts a graphics area from the document read by the reading unit. The writing area extraction unit extracts a writing area from the document read by the reading unit. The character string extraction unit extracts a character string presented in the graphics area. The association unit associates information of the writing area with the graphics area based on the character string extracted by the character string extraction unit.

23 Claims, 9 Drawing Sheets

| GRAPHICS AREA (GRAPHICS AREA IMAGE DATA) | TITLE | PARAGRAPH | CHARACTERISTICS |
|---|---|---|---|
| db1.jpg | FIG. 1: TRENDS IN MOBILE PRODUCTS 1996-2000 | dt1.txt | UPWARD TREND |
| db2.jpg | - | dt2.txt | UPWARD TREND |
| db3.jpg | FIG. 3 | dt3.txt | - |

Fig.1: Trends in mobile products 1996-2000

The graph in fig.1 shows trends in shipment of mobile products from 1996 through 2000. As shown in the graph, an upward trend began in 1999 and has continued.

This graph shows trends in shipment of mobile products from the first half of 2001 through the second half of 2002. As is clear from the graph, growth of company A's products leveled off from the first half of 2002.

Despite company B's efforts to kick start sales of the product (Fig.3) which it introduced in the second half of 2001, sales have remained stagnant since the first half of 2002.

Fig.1: Trends in mobile products 1996-2000

The graph in fig.1 shows trends in shipment of mobile products from 1996 through 2000. As shown in the graph, an upward trend began in 1999 and has continued.

This graph shows trends in shipment of mobile products from the first half of 2001 through the second half of 2002. As is clear from the graph, growth of company A's products leveled off from the first half of 2002.

Despite company B's efforts to kick start sales of the product (Fig.3) which it introduced in the second half of 2001, sales have remained stagnant since the first half of 2002.

```
                        ⋮
<A HREF="image001.jpg">Document image</A>
<img src= "abc001.jpg" />
<tabletitle>The graph in fig.1 shows trends in shipment of mobile products from 1996
through 2000. As shown in the graph, an upward trend began in 1999 and has
continued.</pre>
<tableComment>Upward trend</tableComment>

<img src= "abc002.jpg" />
<tabletitle></tabletitle>
<pre>This graph shows trends in shipment of mobile products from the first half of
2001 through the second half of 2002. As is clear from the graph, growth of company
A's products leveled off from the first half of 2002.</pre>
<tableComment>Upward trend</tableComment>

<img src= "abc003.jpg" />
<tabletitle>Fig.3</tabletitle>
<pre>Despite company B's efforts to kick start sales of the product (Fig.3) which it
introduced in the second half of 2001, sales have remained stagnant since the first
half of 2002.</pre>
<tableComment></tableComment
                        ⋮
```

Document image

Fig.1: Trends in mobile products 1996-2000

The graph in fig.1 shows trends in shipment of mobile products from 1996 through 2000. As shown in the graph, an upward trend began in 1999 and has continued.

This graph shows trends in shipment of mobile products from the first half of 2001 through the second half of 2002. As is clear from the graph, growth of company A's products leveled off from the first half of 2002.

Fig.3

Despite company B's efforts to kick start sales of the product (Fig. 3) which it introduced in the second half of 2001, sales have remained stagnant since the first half of 2002.

FIG. 11

Fig. 1: Trends in mobile products 1996-2000

The graph in fig. 1 shows trends in shipment of mobile products from 1996 through 2000. As shown in the graph, an upward trend began in 1999 and has continued.

Fig. 3

Fig. 3: Trends in mobile products 2001-2002

This graph shows trends in shipment of mobile products from the first half of 2001 through the second half of 2002. As is clear from the graph, growth of company A's products leveled off from the first half of 2002.

<img src= "abc001.jpg" />
<tabletitle>The graph in fig.1 shows trends in shipment of mobile products from 1996 through 2000. As shown in the graph, an upward trend began in 1999 and has continued.</pre>
<tableComment>Upward trend</tableComment>
<relatedfigure>Fig.1: Trends in mobile products 1996-2000<table href="abc003.jpg" /></relatedfigure>

⋮

IMAGE PROCESSING DEVICE, IMAGE PROCESSING METHOD, AND STORAGE MEDIUM STORING PROGRAM THEREFOR

This application claims priority under 35 U.S.C. §119 of Japanese Patent Application No. 2004-109031 filed on Apr. 1, 2004, the entire content of which is hereby incorporated by reference.

BACKGROUND OF THE INVENTION

1. Field of the Invention

The present invention relates to technology which extracts character information and graphics information from images, and organizing the extracted information.

2. Description of the Related Art

Due to the large amount of space required to store paper-based documents, technology which reads documents using scanners or other reading devices, digitize the read documents, and file them in computer devices have received increasing attention in recent years.

When digitizing and filing documents using such technologies, storing the read documents as images causes the character strings in the documents to be stored as images as well, preventing keyword searches and making it necessary to carry out a complex procedure of individually checking each image representing the documents when searching for a desired document.

For this reason, when digitizing and filing documents, it is desirable to accurately identify areas displaying graphics and areas displaying character strings, and convert the character strings inside images representing character strings into text, to facilitate document searches.

An example of a technology which accurately identifies an area of character strings and an area of graphics in a document is disclosed in JP H1-266689A, and application of this technology makes it possible to accurately recognize character strings in documents for conversion to text.

Converting to text and filing the character strings in the character string areas inside a document makes keyword searches possible and facilitates reuse of digitized documents. However, it is sometimes desirable to reuse digitized documents to search not only the writing but also the graphs and photographs, etc., contained in a document. With the above-described approach of converting writing to text and filing it, it is impossible to search for graphs and photographs, etc. inside documents, because the desired information is searched through matches with character strings, and it is therefore impossible to search for the desired information.

The present invention has been made in view of the above circumstances, and provides a technology for facilitating searches of graphics areas of digitized documents.

SUMMARY OF THE INVENTION

To address the problems discussed above, the present invention provides an image processing device including: a reading unit which reads a document and generates an image file representing an image of the read document; a graphics area extraction unit which extracts a graphics area in the image represented by the image file; a writing area extraction unit which extracts a writing area in the image represented by the image file; a character string extraction unit which extracts a character string present in the graphics area extracted by the graphics area extraction unit; a text extraction unit which extracts, from the writing area extracted by the writing area extraction unit, text that includes the same character string as the character string extracted by the character string extraction unit; and a document data generation unit which generates document data representing a document containing the graphics area extracted by the graphics area extraction unit and the text extracted by the text extraction unit.

According to this image processing device, an image file representing a read document is generated, and an area of graphics in the image represented by the image file and an area of writing in the image represented by the image file are extracted. Text including the same character string as the character string in the extracted graphics area is extracted from the writing area, and document data representing a document which includes the extracted graphics area and the extracted text is generated.

Since document data representing a document including graphics areas and text in the graphics area is generated, searching the document data for the character string related to the graphics area will return document data including the graphics area as the search result.

According to an embodiment of the present invention, searches of graphics areas in digitized documents are facilitated.

BRIEF DESCRIPTION OF THE DRAWINGS

Embodiments of the present invention will be described in detail based on the following figures, wherein.

DETAILED DESCRIPTION OF THE INVENTION

Configuration of an Embodiment

Figure 1:
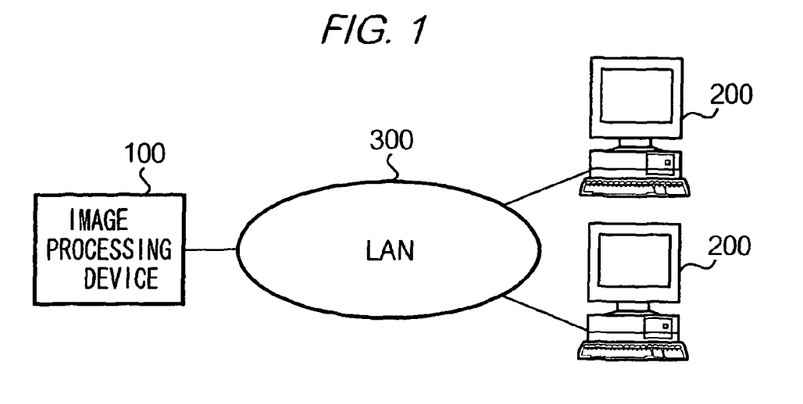
FIG. 1 shows a configuration of a communications system according to an embodiment of the present invention.

FIG. 1 shows an example of a communications system including an image processing device 100 according to an embodiment of the present invention.

A PC (Personal Computer) 200 is a personal computer device, and is connected to a LAN (Local Area Network) 300. The PC 200 stores WWW (World Wide Web) browser software, and when this software is launched, various files are acquired from the image processing device 100 which is connected to the LAN 300, content in the acquired files can be interpreted and a page can be displayed.

Figure 2:
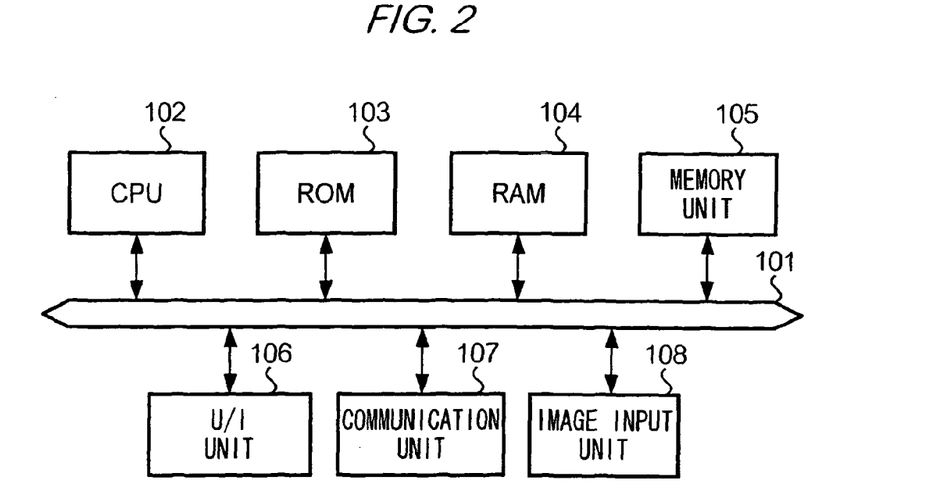
FIG. 2 is a block diagram which shows a configuration of principal parts of an image processing device according to an embodiment of the present invention.

FIG. 2 is a block diagram showing a configuration of principal components according to the present invention, within a hardware configuration of the image processing device 100 according to an embodiment of the present invention. As shown in FIG. 2, components of the image processing device 100 are connected to a bus 101, and transmission of data between the components is performed via this bus 101.

A communication unit 107 is connected to the LAN 300 via a communication line (not shown) and functions as a communications interface which performs communications with the PC 200 and other external devices which are also connected to the LAN 300. The communication unit 107, under control by a CPU 102, supplies data sent from the LAN 300 to the CPU 102, and transmits to the LAN 300 the data supplied from the CPU 102 via the bus 101.

An image input unit 108 is provided with an image scanner which reads documents as images, and, under the control of the CPU 102, reads documents placed on the image scanner and stores image files representing the read documents in a memory unit 105.

A U/I (User Interface) unit 106 is provided with plural keys (not shown) for operating the image processing device 100, and supplies instructions to the CPU 102 in accordance with keys which are pressed by a user. For example, the U/I unit 106 may be provided with a read key, and when this read key is pressed, a read instruction is supplied to the CPU 102 instructing that a document placed on the image input unit 108 be read. Further, the U/I unit 106 is provided with a liquid crystal display (not shown), which, under the control of the CPU 102, displays text, graphic screens, menu screens or the like on the liquid crystal display.

The memory unit 105 is provided with a device capable of storing data, such as a hard disk device, and stores such programs as a server program which causes the image processing device 100 to function as a WWW server device, a control program which controls the various units of the image processing device 100, and a CGI (Common Gateway Interface) program which operates in accordance with instructions from external devices.

The memory unit 105 also stores various types of files, such as image files generated by the image input unit 108 and files written in HTML (Hyper Text Markup Language).

Figure 3:
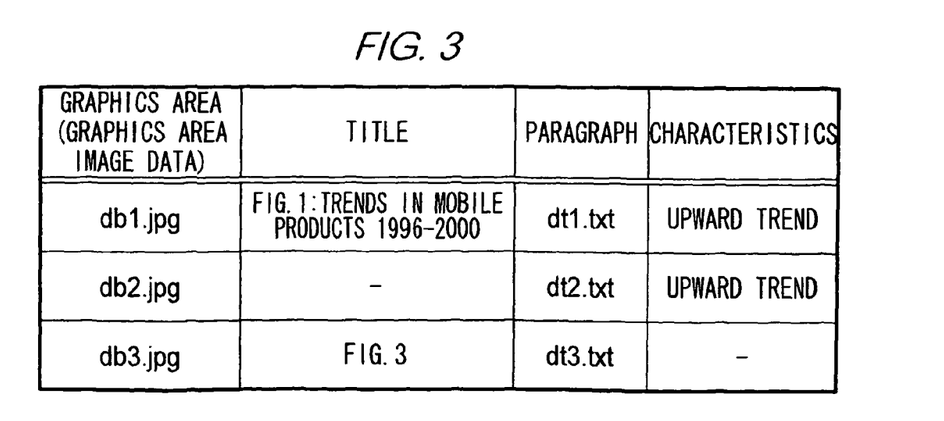
FIG. 3 shows the format of an association table stored in the image processing device according to this embodiment.

The memory unit 105 also stores a format association table TB1, as shown in FIG. 3. The association table TB1 is a table which associates files representing graphics areas in read documents with character strings related to the graphics areas, and contains file names of the image files representing the graphics areas in the documents, character strings indicating titles of the graphics areas, character strings describing the graphics areas, and character strings indicating characteristics of the graphics.

A ROM 103 contains, for example, a program called an IPL (Initial Program Loader). Once supplied with electric power from a power source not included in the drawings, the CPU 102 reads the IPL from the ROM 103 and executes it. When the IPL is executed, the CPU 102 reads a server program and a control program, which are stored in the memory unit 105, launches them, and controls the various units of the image processing device 100, using a RAM 104 as a work area.

When the CPU 102 launches the server program, the image processing device 100 functions as a WWW server, and implements communications in compliance with HTTP. Further, the CPU 102 launches the control program to perform the processes shown in the flow chart shown in FIG. 4 and FIG. 5, read a document from the image input unit 108, and generate a structured document displaying a summary of the read document. This structured document is text data, and is written in, for example, XHTML (Extensible Hypertext Markup Language). Furthermore, the language of the structured document is not limited to XHTML, and may be XML (Extensible Markup Language), HTML, SGML (Standard Generalized Markup Language), or any other language that can represent structured documents.

As described above, it can be said that the configuration of the image processing device 100 is identical to a hardware configuration of a common computer device, in the sense that a CPU executes programs to perform a variety of functions.

Operation of an Embodiment

Figure 6:
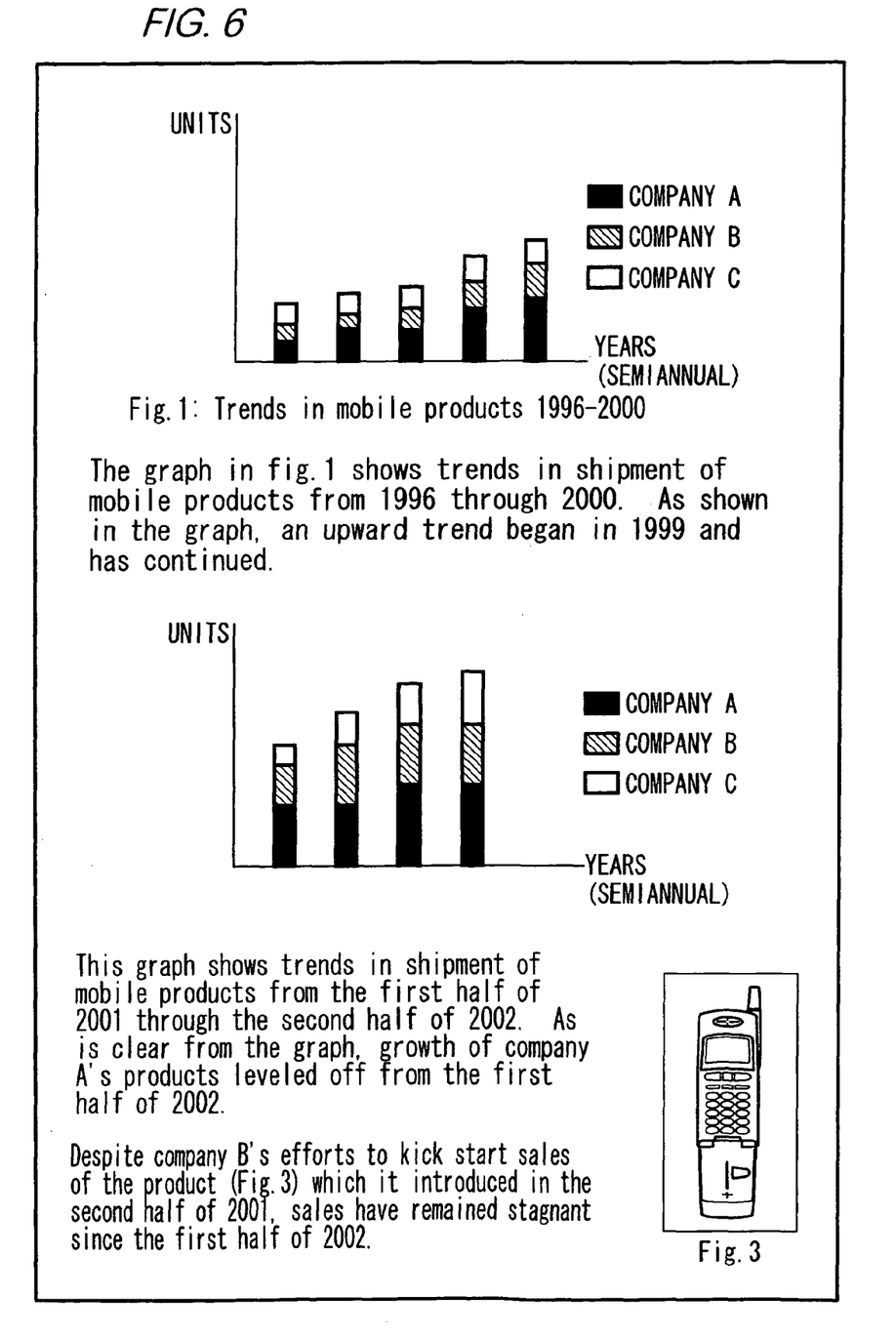
FIG. 6 shows a document which an image input unit reads.

Below is a description of an operation of the present embodiment. First, with reference to the flowchart in FIG. 4, a description is given of an operation wherein the image processing device 100 generates a structured document followed by a description of an operation wherein the image processing device 100 provides to a PC 200 a search service using the generated structured document. Note that in the following descriptions of operations, it is assumed that power is being supplied to the image processing device 100 and that the CPU 102 is already executing a control program. Also, in these descriptions of operations, it is assumed that the image processing device 100 reads a document as shown in FIG. 6.

Operation When Generating a Structured Document

Figure 4:
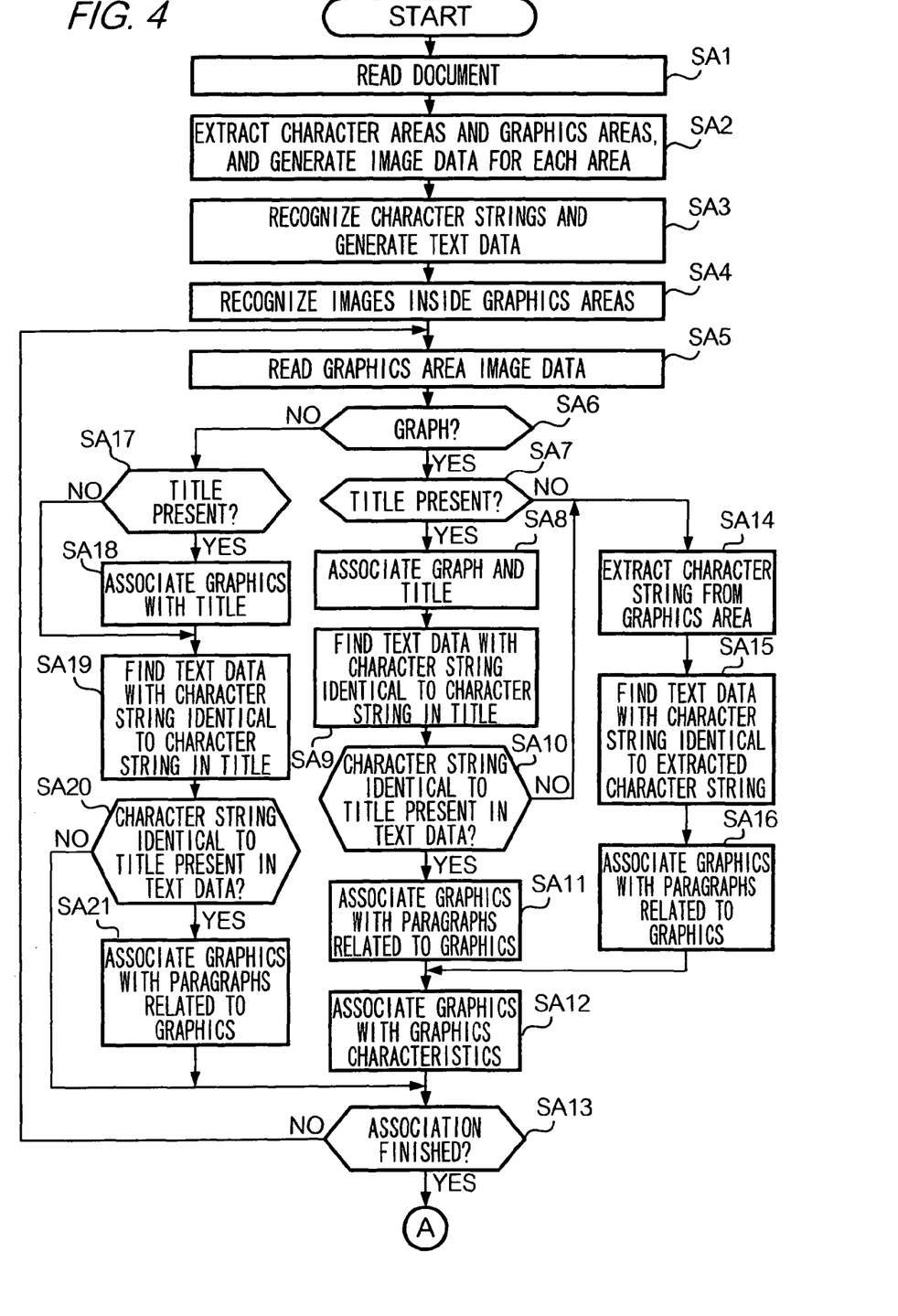
FIG. 4 is a flowchart showing a flow of processes which are performed when a CPU 102 generates a structured document.

When a user of the image processing device 100 presses a read key provided on the U/I unit 106, a read instruction for a document placed on an image input unit 108 is output to the CPU 102 from the U/I unit 106. When the read instruction is supplied, the CPU 102 causes the image input unit 108 to read the document placed on the image input unit 108 (FIG. 4, step SA1). When the image input unit 108 finishes reading the document, it generates an image file representing the read document in the memory unit 105, applies a filename, which uniquely identifies the generated file (e.g., "image001.jpg"), to the image file, and sends a termination message, which reports that reading of the document is complete, to the CPU 102.

When the CPU 102 receives the termination message, it analyzes the image file generated in the memory unit 105, extracts areas displaying text and areas displaying graphics, and generates data representing images of the extracted areas, for each extracted area (step SA2).

Figure 7:
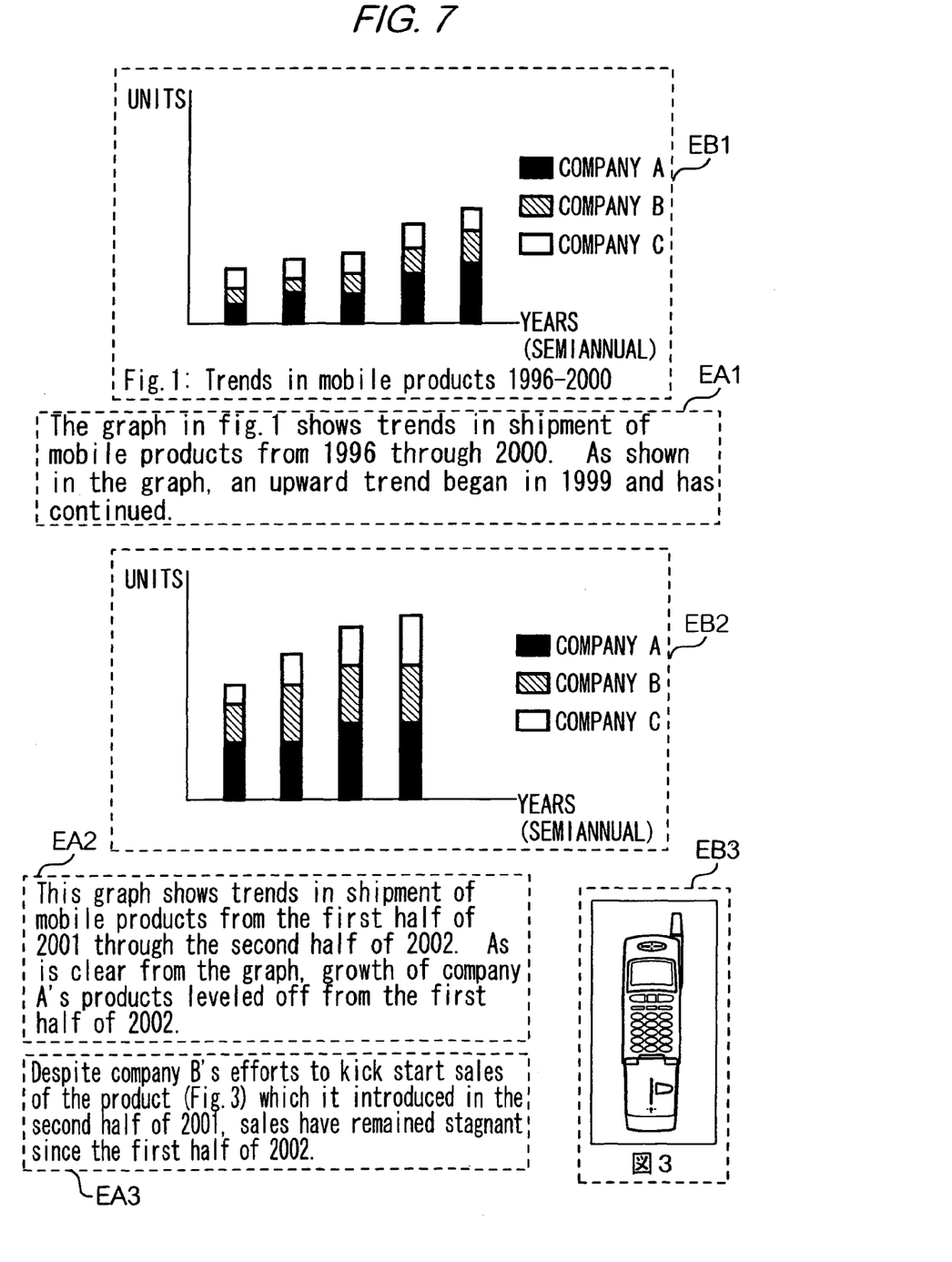
FIG. 7 shows an area extracted from an image file.

For example, when the image input unit 108 has read the document shown in FIG. 6, writing areas EA1 through EA3 are extracted as areas displaying text, and graphics areas EB1 through EB3 are extracted as areas displaying graphics, as shown in FIG. 7. Thereafter, text area image data DA1 (filename: da1.jpg), which represents text area EA1; text area image data DA2 (filename: da2.jpg), which represents text area EA2, text area image data DA3 (filename: da3.jpg), which represents text area EA3; graphics area image data DB1 (filename: db1.jpg), which represents graphics area EB1; graphics area image data DB2 (filename: db2.jpg), which represents graphics area EB2; and graphics area image data DB3 (filename: db3.jpg), which represents graphics area EB3, are generated. Of these generated files, the filenames of image data representing graphics areas are stored in a graphics area field in the association table TB1.

Moreover, in addition to areas which include diagrams such as graphs and tables, areas including photographs, pictures, and so on are also extracted as areas displaying graphics. In other words, in the present description, graphics includes not only graphs and tables, but a broad range of concepts, including photographs, pictures, and so on.

Next, the CPU 102 analyzes the text area image data DA1 through DA3 representing text areas, extracts character strings in the text areas, and generates text data DT1 (filename: dt1.txt) through DT3 (filename: dt3.txt) representing the extracted character strings (step SA3).

When the CPU 102 finishes generating the text data, it analyzes the graphics area image data DB1 through DB3 representing graphics areas and recognizes images represented by the graphics area image data (step SA4.) For example, for the document shown in FIG. 6, the images which are represented by the graphics area image data DB1 and graphics area image data DB2 are identified as bar graphs, and the image which is represented by the graphics area image data EB3 is recognized as a photograph.

Next, the CPU 102 sequentially reads the generated graphics image data from the memory unit 105 (step SA5) and determines whether the image represented by the read graphics area image data is an image displaying a graph, based on the recognition results in step SA4 (step SA6).

For example, when the CPU 102 reads the graphics area image data DB1, since this data was recognized as a bar graph in step SA4, in step SA6 the image represented by the graphics area image data DB1 is determined to be a graph (step SA6: YES).

When "YES" is determined in step SA6, the CPU 102 analyzes the graphics area image data and determines whether a character string is present inside the image represented by the graphics area image data, indicating a title of the graph (step SA7). Specifically, the CPU 102 extracts the character strings in the image represented by the graphics area image data, and if there is text containing the character string "FIG." or "Table" in the extracted character strings, it determines that that character string is the title of the image represented by the graphics area.

For instance, as shown in FIG. 7, in the case of graphics area image data DB1, the graphics area EB1 which this data represents, contains the character string "FIG. 1: Trends in Mobile Products 1996-2000," so the CPU 102 determines that this character string is the title of the image represented by the graphics area image data EB1 (step SA7: YES).

When "YES" is determined at step SA7, the CPU 102 associates the character string which indicates the title as a character string representing the title of graphics area image data DB1. Specifically, the CPU 102 stores the character string "FIG. 1: Trends in Mobile Products 1996-2000" in the title field of the row in which the filename "db1.jpg" for the graphics area image data DB1 is stored in the association table TB1 (step SA8), as shown in FIG. 3.

Next, the CPU 102 searches for text data which includes a character string identical to the character strings included in the title (step SA9). For instance, the text data DT1 includes a character string identical to the "FIG. 1" included in the title, so the text data DT1 is extracted as text data which includes a character string identical to the title.

When the CPU 102 extracts the text data DT1 which includes a character string identical to the title (step SA10: YES), it determines that the extracted text data is a paragraph associated with the graphics area image data DB1, and associates the graphics area image data DB1 and the text data DT1. Specifically, the CPU 102 stores the filename of the extracted text data DT1 in the paragraph field of the row in which the filename "db1.jpg" for the graphics area image data DB1 is stored (step SA11), as shown in FIG. 3.

Next, the CPU 102 extracts characteristics of the graph represented by the graphics area image data and generates a character string which represents the extracted characteristics. For example, in the case of the graph represented by the graphics area image data DB1, the graph indicates an upward trend, so the character string "upward trend" is generated. Character strings representing graph characteristics are generated based on factors such as graph titles, direction of axes, units of axes, and so on. Next, the CPU 102 associates the generated character string with the graphics area image data. Specifically, the CPU 102 stores the generated character string "upward trend" in the characteristics field of the row in which the filename "db1.jpg" for the graphics area image data DB1 is stored in the association table TB1 (step SA12), as shown in FIG. 3.

When the CPU 102 completes the process in step SA12, it determines whether the titles, paragraphs, and characteristics have been associated for all the graphics area image data (step SA13). Since the CPU 102 has not completed associations for graphics area image data DB2 and graphics area image data DB3 at this point, it returns to step SA5 and continues the process (step SA13: NO).

Next, the CPU 102 reads the graphics image data DB2 (step SA5) and determines whether the image represented by the read graphics area image data DB2 is an image representing a graph, based on the recognition results in step SA4 (step SA6). Since the graphics area image data DB2 was recognized as a graph in step SA4, in step SA6 the image represented by the graphics area image data DB2 is determined to be a graph (step SA6: YES).

When "YES" is determined in step SA6, the CPU 102 analyzes the graphics area image data and determines whether a character string is present inside the image represented by the graphics area image data, indicating a title of the graph (step SA7). In the case of the graphics area image data DB2, the graphics area EB2 represented by this data does not contain the character strings "FIG." or "Table", so the CPU 102 determines that no character strings indicating a title of a graph are present in the image represented by the graphics area image data DB2 (step SA7: NO).

When "NO" is determined at step SA7, the CPU 102 next extracts character strings included in the area of the image represented by the graphics area image data DB2 (step SA14), and searches for text data which includes the same character strings as the extracted character strings (step SA15). In the case of the graphics area image data DB2, character strings "Company A," "Company B," "Company C," "No. of Units," and "Year (Half-Yearly)" are extracted from the graphics area EB2 represented by this data. Since the text data DT2 includes the same character string as the extracted character string "Company A," the text data DT2 is found to be a paragraph associated with the graphics area image data DB2.

When the CPU 102 determines that the text data DT2 is a paragraph associated with the graphics area image data DB2, it stores the filename "dt2.txt" of the corresponding text data DT2 in the paragraph field of the row in which the filename "db2.jpg" for the graphics area image data DB2 is stored (step SA16) in the association table TB1, as shown in FIG. 3.

Next, the CPU 102 extracts characteristics of the graph represented by the graphics area image data DB2 and generates a character string which represents the extracted characteristics. In the case of the graph represented by the graphics area image data DB2, the graph indicates an upward trend, so the CPU 102 generates the character string "upward trend" and stores the generated character string "upward trend" in the characteristics field of the row in which the filename "db2.jpg" for the graphics area image data DB2 is stored in the association table TB1 (step SA12), as shown in FIG. 3.

When the CPU 102 completes the process in step SA12, it determines whether the titles, paragraphs, and characteristics have been associated for all the graphics area image data (step SA13). Since the CPU 102 has not completed associations for the graphics area image data DB3 at this point, it returns to step SA5 and continues the process (step SA13: NO).

Next, the CPU 102 reads the graphics image data DB3 (step SA5) and determines whether the image represented by the read graphics area image data DB3 is an image displaying a graph (step SA6), based on the recognition results in step SA4. Since the graphics area image data DB3 was recognized as a photograph in step SA4, in step SA6 the image represented by the graphics area image data DB3 is determined to be a photograph (step SA6: NO).

When "NO" is determined in step SA6, the CPU 102 analyzes the graphics area image data and determines whether a character string is present inside the image represented by the graphics area image data, indicating a title of the image (step SA17). In the case of graphics area image data DB3, the graphics area EB3 represented by this data contains the character string "FIG. 3", so the CPU 102 determines that this character string is the title of the image represented by the graphics area image data EB3 (step SA17: YES).

When "YES" is determined at step SA17 the CPU 102 associates the character string which indicates the title as a character string which represents the title of graphics area image data DB3. The CPU 102 stores the character string "FIG. 3" in the title field of the row in which the filename "db3.jpg" for the graphics area image data DB3 is stored in the association table TB1, as shown in FIG. 3 (step SA18).

Next, the CPU 102 searches for text data which includes a character string identical to the character string included in the title (step SA19). The text data DT3 includes a character string identical to the "FIG. 3" included in the title, so the text data DT3 is extracted as text data which includes a character string identical to the title. When the CPU 102 extracts the text data DT3 which includes a character string identical to the title (step SA20: YES), it determines that the extracted text data is a paragraph associated with the graphics area image data DB3, and, as shown in FIG. 3, stores the filename of the extracted text data DT3 in the paragraph field of the row in which the filename "db3.jpg" for the graphics area image data DB3 is stored (step SA21).

When the CPU 102 completes the process in step SA21, it determines whether the titles, paragraphs, and characteristics have been associated for all the graphics area image data (step SA13). Since the CPU 102 has at this point completed the associations for title, paragraph, and characteristics for all graphics area image data DB1 through DB3, "YES" is determined at step SA13.

When "YES" is determined at step SA13, the CPU 102 begins generating a structured document displaying a summary of the document which was read by the image input unit 108.

Figure 5:
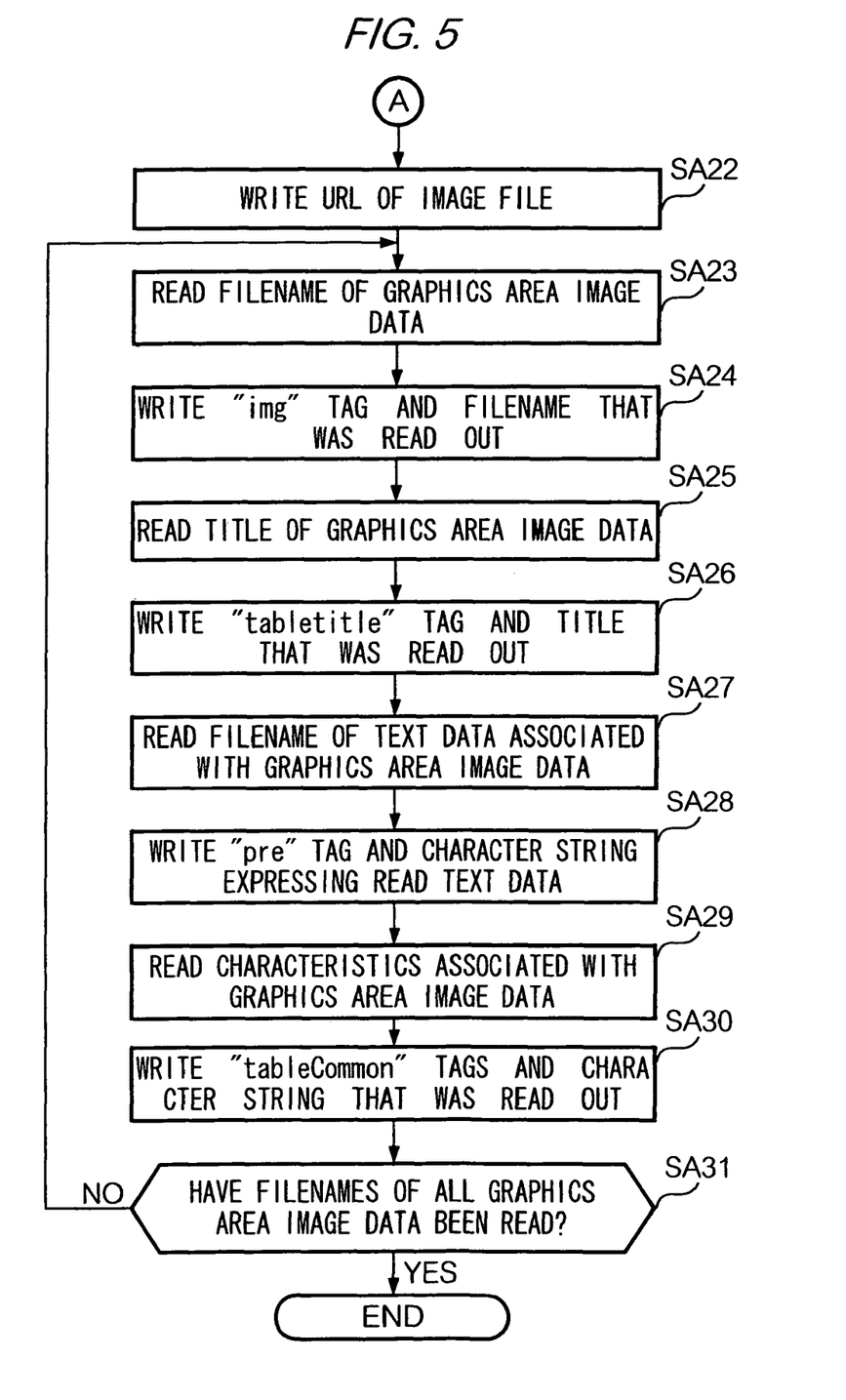
FIG. 5 is a flowchart showing a flow of processes which are performed when a CPU 102 generates a structured document.

First, the CPU 102 writes a URL (Uniform Resource Locator), which indicates the memory position of an image file representing the read document, in the structured document (FIG. 5: step SA22).

Figure 8:
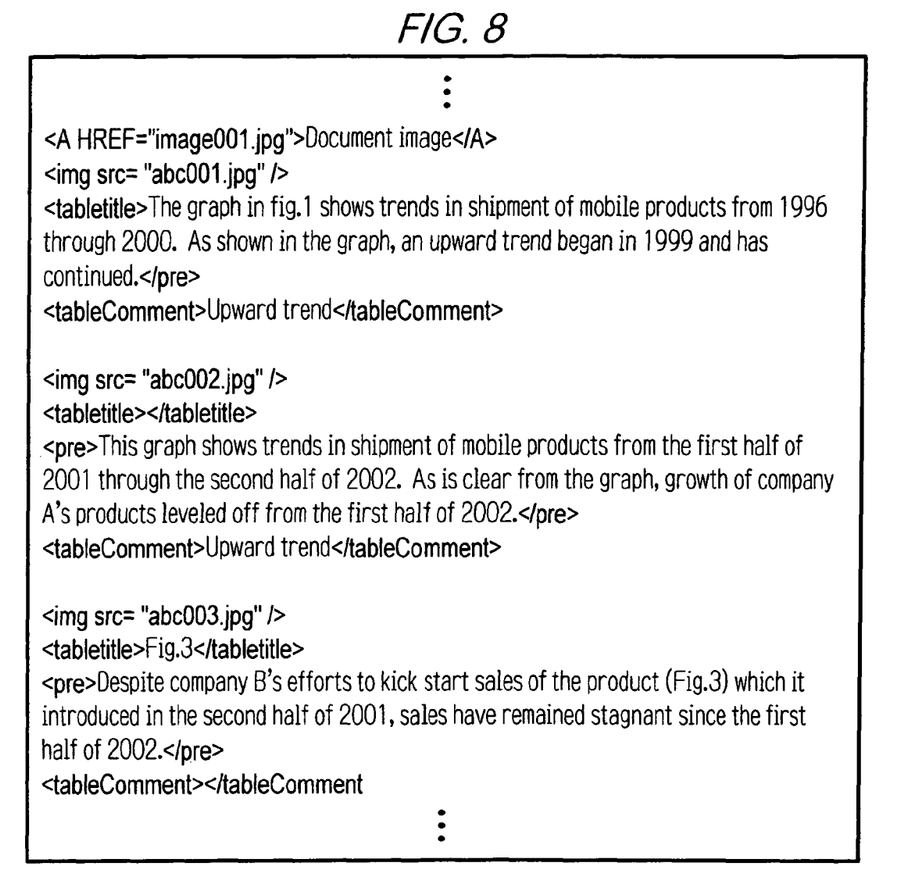
FIG. 8 shows a structured document generated by the image processing device.

Next, the CPU 102 reads the filename "db1.jpg" of the graphics area image data stored in the association table TB1 (FIG. 5: step SA23), and writes the read filename "db1.jpg" as an attribute value, together with a tag "img" which causes an image to be displayed (step SA24), as shown in FIG. 8.

Next, the CPU 102 reads the title "FIG. 1: Trends in Mobile Products 1996-2000" of the graphics area image data DB1, which is associated with the filename of the graphics area image data DB1 and is stored in the association table TB1 (step SA25), and writes the extracted title together with the tag "tabletitle," as shown in FIG. 8 (step SA26).

Next, the CPU 102 reads the filename "dt1.txt" of the text data, which is associated with the filename of the graphics area image data DB1 and is stored in the paragraph field of the association table TB1 (step SA27), and writes the character string written in the file of the read filename, together with the tag "pre," which causes the character string to be displayed, as shown in FIG. 8 (step SA28).

Next, the CPU 102 reads the character string "upward trend," which is associated with the filename of the graphics area image data DB1 and is stored in the characteristics field of the association table TB1 (step SA29), and writes the read character string together with the tag "tableComment," as shown in FIG. 8 (step SA30).

When the CPU 102 completes the process in step SA29, it determines whether it has read all the filenames of the graphics area image data stored in the association table TB1 (step SA31). Since the CPU 102 has not yet read the graphics area image data DB2 and the graphics area image data DB3, it returns to step SA23 and continues the process.

Hereafter, the CPU 102 generates the structured document as shown in FIG. 8, through the processes in step SA23 through step SA31, in the same manner as for the graphics area image data DB1.

When the CPU 102 determines at step SA31 that it has read the filenames of all the graphics area image data stored in association table TB1 (step SA31: YES), the generation of the structured document is completed, a filename "bunnsyo001", which uniquely identifies the generated structured document, is attached to the structured document, and the generated structured document is stored in the memory unit 105.

Operation When Providing a Structured Document to the PC 200

Below is a description of an operation when the image processing device 100 provides the generated structured document to the PC 200. Note that in the following description, it is assumed that a WWW browser is already launched in the PC 200.

Figure 9:
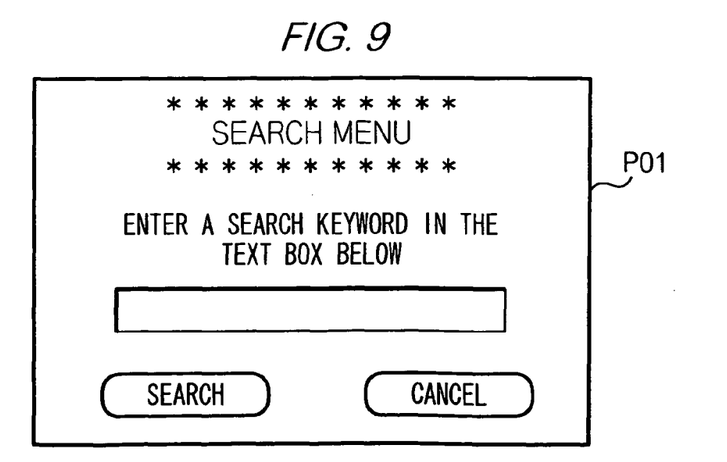
FIG. 9 shows a page which the image processing device provides.

When a user of the PC 200 operates the PC 200, inputting a URL for an HTML file which represents a page, as illustrated in FIG. 9, from among HTML files stored in the image processing device 100, and performs an operation to display this page, the PC 200 sends an HTTP request message, which includes the input URL, to the image processing device 100.

When the HTTP request message is received by the communication unit 107 of the image processing device 100, the CPU 102 reads an HTML file specified by the URL included in this message from the memory unit 105. Thereafter, the CPU 102 generates an HTTP response message including the read HTML file and sends this message to the PC 200.

When this message is received by the PC 200, the HTML file included in the message is interpreted by the WWW browser running on the PC 200, and a page P01 as shown in FIG. 9, on which search keywords for searching can be entered, is displayed on a display of the PC 200. Thereafter, when the user of the PC 200 enters, for example, the character string "mobile" in a textbox in the page P01, and then performs an operation of clicking a "search" button on the page P01, the PC 200 extracts a URL for a CGI program stored in the image processing device 100 from the received HTML file, and sends an HTTP request message, which includes the extracted URL and the character string entered in the textbox, to the image processing device 100.

When the CPU 102 receives this message, it extracts the character string "mobile" and the URL of the CGI program, which are included in the received message. Thereafter, the CPU 102 reads the CGI program specified by the extracted URL from memory unit 105, and launches the CGI program, using the extracted character string as an argument for the CGI program.

When the CPU 102 launches the CGI program, it uses data which is being used as an argument, i.e., the character string entered in the page P01, as a search key and searches for a structured document containing a character string identical to the search key from among structured documents stored in the memory unit 105.

When the CPU 102 finds, for example, the structured document whose filename is "bunnsyo001" and which was generated by the above-mentioned operation, as a structured document containing a character string identical to the character string used as the search key, it generates an HTML file, writing a URL, which indicates a memory position of the structured document, as a hyperlink, generates an HTTP response message containing this HTML file, and sends the generated HTTP response message to the PC 200.

When this message is received by the PC 200, the HTML file included in the message is interpreted by the WWW browser and the URL for the structured document containing the character string used as a search key is displayed on the display of the PC 200.

Thereafter, when the user of the PC 200 performs an operation of clicking this URL, the PC 200 extracts from the HTML file the URL of the structured document written as a hyperlink in the HTML file and sends an HTTP request message including the extracted URL to the image processing device 100.

Figure 10:
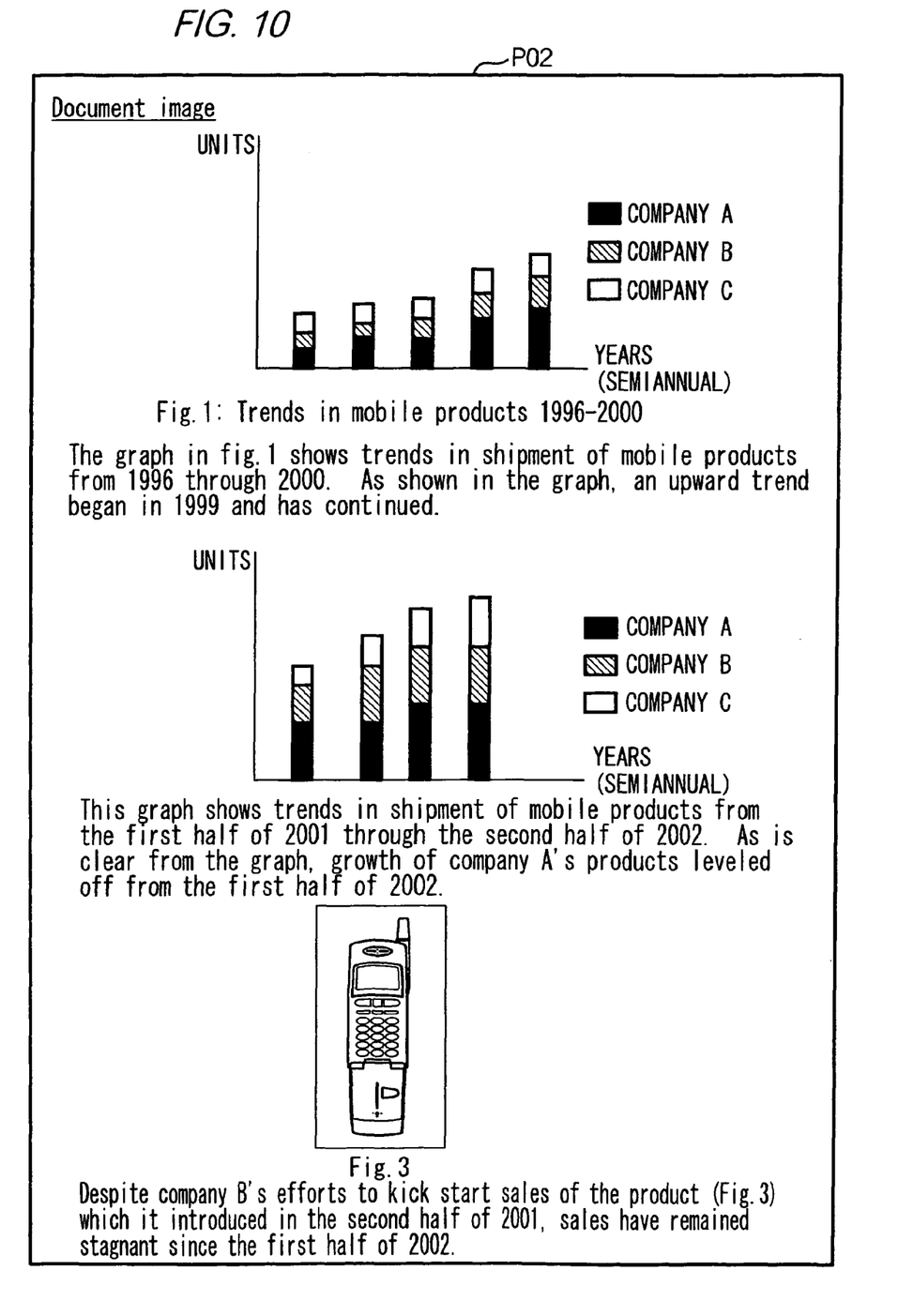
FIG. 10 shows a page represented by the structured document.

When the HTTP request message is received by the communication unit 107 of the image processing device 100, the CPU 102 reads the structured document specified by the URL included in this message from the memory unit 105. Thereafter, the CPU 102 generates an HTTP response message including the read structured document and sends this message to the PC 200. When this message is received by the PC 200, the structured document included in the message is interpreted by the WWW browser running on the PC 200, and a page P02, displaying the structured document, is displayed, for example, on the display of the PC 200, as shown in FIG. 10.

Then, when the user of the PC 200 performs an operation of clicking on a filename of the image file displayed in the upper portion of the page P02, an HTTP request message including a URL for this image file is sent from the PC 200 to the image processing device 100.

When the HTTP request message is received by the communication unit 107 of the image processing device 100, the CPU 102 reads the image file specified by the URL included in this message from the memory unit 105. Then, the CPU 102 generates an HTTP response message including the read image file and sends this message to the PC 200.

When this message is received by the PC 200, the image file included in the message is interpreted by the WWW browser and an image of the document illustrated in FIG. 6 is displayed on the display of the PC 200.

As described above, according to the present embodiment, when a document is read, an image file representing the read document is generated, and a structured document containing information related to graphics areas inside the read document is also generated. Since only character strings related to the graphics areas, and not all character strings in the read document, are written to the structured document, searching for character strings in the structured document makes it possible to search images in the graphics areas indirectly.

Modifications

Although a description of an embodiment of the present invention is given above, the present invention may be embodied in many other ways, and is not limited to the above-described embodiment. For example, the present invention may be implemented by varying the above embodiment in the manner described below.

According to the above embodiment, in cases where graphics areas represent photographs or pictures, character strings indicating characteristics of the graphics areas also may be generated and written into the structured document, as with graphs. For example, if a graphics area displays a photograph of people, the number of people may be identified and written in a "tableComment" tag, or if a graphics area displays a landscape, the landscape may be identified, and character strings such as "mountains" or "sea" indicating characteristics of the landscape may be written in a "tableComment" tag.

Graphics identified as graphs according to the above embodiment are not limited to bar graphs, but other types of graphs, such as pie charts or line graphs, may also be identified as graphs.

According to the above embodiment, one structured document is generated for a read document, but structured documents may be generated for image data of each graphics area.

Figure 11:
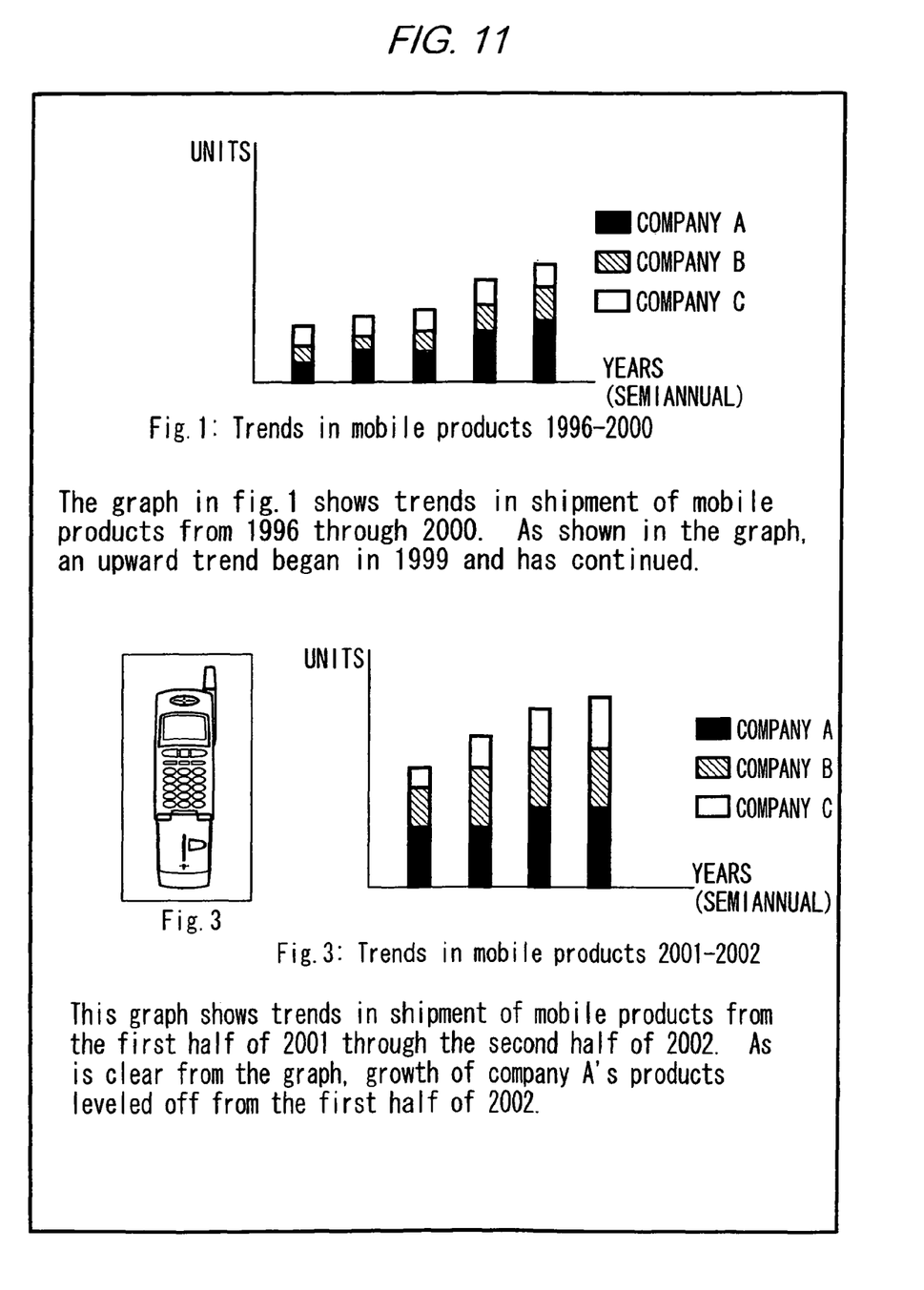
FIG. 11 shows a document read by the image input unit.
Figure 12:
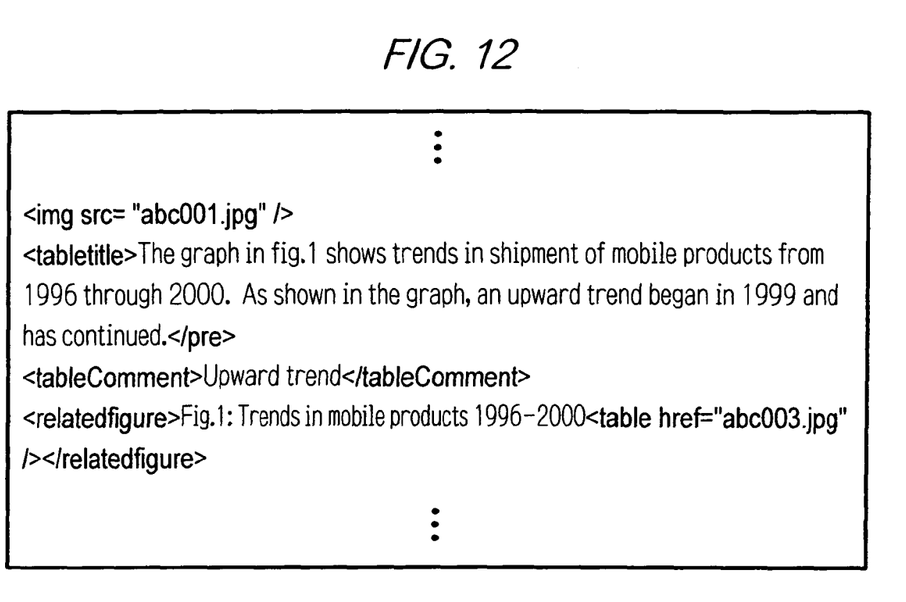
FIG. 12 shows a structured document generated by the image processing device.

Moreover, if a structured document for image data of each graphics area is generated, titles of other graphics areas and URLs of image data of other graphics areas related to an image in a graphics area may be written to the structured document. For example, if the image processing device 100 reads a document illustrated in FIG. 11, a character string "FIG. 1: Trends in Mobile Products 1996-2000," a character string "FIG. 2," and a character string "FIG. 3: Trends in Mobile Products 2001-2002" are extracted as titles. When generating a structured document for image data of each graphics area, the CPU 102 reads titles similar to the character strings of the titles from the association table TB1, and reads a filename for graphics area image data associated with the read titles. In the case of a document shown in FIG. 11, a comparison of the title "FIG. 1: Trends in Mobile Products 1996-2000" of the graph in the upper portion of the document with the title "FIG. 3: Trends in Mobile Products 2001-2002" of the graph in the lower portion of the document shows that a character string "Trends in Mobile Products" matches, and there is similarity. When generating a structured document related to the graph in the upper portion of the document, the CPU 102 reads the title "FIG. 3: Trends in Mobile Products 2001-2002" and a filename of image data of a graphics area associated with this title from the association table TB1, and writes it to the structured document illustrated in FIG. 12 together with, for example, a tag "related figure." According to this embodiment, related drawings in a document can easily be detected.

If the image processing device 100 does not find any character strings "FIG." or "Table" in a graphics area, it identifies character strings in the graphics area and associates the identified character strings with text data containing identical character strings as paragraphs related to the graphics area, but if there are many instances of text data including character strings identical to the identified character string, then it may associate paragraphs close to the graphics area in the document as paragraphs related to the graphics area. It is also possible to associate text data which contains the most character strings identical to the identified character strings as being a paragraph related to the graphics area.

Moreover, if character strings such as "FIG." or "Table" are not found in a graphics area, it is possible to identify images in graphics areas and associate text data containing words which express characteristics of the images in the graphics areas as paragraphs related to the graphics areas.

A user of the image processing device 100 may store keywords denoting items of personal interest in the memory unit 105 beforehand by operating the U/I unit 106, after which the image processing device 100 may generate structured documents for graphics and writing related to the keywords stored in the memory unit 105. For example, if the user of the image processing device 100 is interested in "Company A," and stores a character string "Company A" in the memory unit 105, then the image processing device 100 reads a document illustrated in FIG. 6, identifies character strings in graphics areas, and associates filenames of the graphics area image data DB1 and DB2, which include the character string "Company A," and stores them in the association table TB1. The image processing device 100 extracts titles, paragraphs, and characteristics related to the graphics area image data DB1 and DB2 and generates a structured document.

According to this embodiment, only graphics and writing related to specified keywords are extracted from the read document, and a structured document is generated. Consequently, it becomes possible to eliminate the labor of searching for structured documents by specifying search keywords.

While titles (character strings between "tabletitle" tags) and graphics characteristics (character strings between "tableComment" tags) of graphics areas are not displayed according to the above embodiment, structured documents may be generated such that these are displayed.

The image processing device 100 may be provided with a printing unit such as a printer, and print a structured document upon an instruction input by a user. The image processing device 100 may print structured documents extracted by document searches.

The image processing device 100 according to the above embodiment may receive image files representing documents sent over a LAN 300, and generate structured documents related to the image files for the received image files.

As discussed above, the present invention provides an image processing device including: a reading unit which reads a document and generates an image file representing an image of the read document; a graphics area extraction unit which extracts a graphics area in the image represented by the image file; a writing area extraction unit which extracts a writing area in the image represented by the image file; a character string extraction unit which extracts a character string present in the graphics area extracted by the graphics area extraction unit; a text extraction unit which extracts, from the writing area extracted by the writing area extraction unit, text that includes the same character string as the character string extracted by the character string extraction unit; and a document data generation unit which generates document data representing a document containing the graphics area extracted by the graphics area extraction unit and the text extracted by the text extraction unit.

According to this image processing device, an image file representing a read document is generated, and an area of graphics in the image represented by the image file and an area of writing in the image represented by the image file are extracted. Text including the same character string as the character string in the extracted graphics area is extracted from the writing area, and document data representing a document which includes the extracted graphics area and the extracted text is generated.

Since document data representing a document including graphics areas and text in the graphics area is generated, searching the document data for the character string related to the graphics area will return document data including the graphics area as the search result.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described to best explain the principles of the invention and its practical applications, to thereby enable others skilled in the art to understand various embodiments of the invention and various modifications thereof, to suit a particular contemplated use. It is intended that the scope of the invention be defined by the following claims and their equivalents.

What is claimed is:

1. An image processing device comprising:
   a reading unit which reads a document and generates an image file representing an image of the read document;
   a graphics area extraction unit which extracts a graphics area in the image represented by the image file, the graphics area being an area containing a graphical image;
   a writing area extraction unit which extracts a writing area in the image represented by the image file;
   a character string extraction unit which extracts a character string present in the graphics area extracted by the graphics area extraction unit, the character string being located in the graphics area itself or in an area within close proximity to the graphics area;
   a text extraction unit which extracts, from the writing area extracted by the writing area extraction unit, text that includes the same character string as the character string extracted by the character string extraction unit; and
   a document data generation unit which generates document data representing a document containing the graphics area extracted by the graphics area extraction unit and the text extracted by the text extraction unit,
   wherein the generated document data includes at least one character string identifying a visual characteristic of the extracted image data.

2. The image processing device according to claim 1, wherein,
   the document data generation unit generates document data representing a document which contains the graphics area extracted by the graphics area extraction unit, the character string extracted by the character string extraction unit, and the text extracted by the text extraction unit.

3. The image processing device according to claim 1, wherein,
   the document data generation unit generates document data containing information indicating a storage position of the image file.

4. The image processing device according to claim 1, wherein,
   the document data generation unit extracts a character string identical to a prescribed character string from among the text extracted by the text extraction unit, and generates document data representing a document containing the extracted character string.

5. The image processing device according to claim 1 wherein,
   the graphics area extraction unit extracts a plurality of graphics areas;
   the image processing device further comprises a related information extraction unit which extracts information related to other graphics areas which have relevance to the graphics areas, for each of the plurality of graphics areas extracted by the graphics area extraction unit; and the document data generation unit generates document data containing the information extracted by the related information extraction unit.

6. The image processing device according to claim 1, further comprising:

a characteristics extraction unit which extracts characteristics of the graphics area extracted by the graphics area extraction unit wherein, the document data generation unit generates document data containing a character string representing the characteristics extracted by the characteristics extraction unit.

7. A computer-implemented image processing method, the computer-implemented image processing method executed using a processor, comprising:

reading a document and generating an image file representing an image of the read document;

extracting a graphics area in the image represented by the image file, the graphics area being an area containing a graphical image;

extracting a writing area in the image represented by the image file;

extracting a character string present in the graphics area, the character string being located in the graphics area itself or in an area within close proximity to the graphics area;

extracting, from the writing area, text that includes the same character string as the character string extracted in a process of extracting the character string; and generating document data representing a document containing the graphics area and the text, wherein the generated document data includes at least one character string identifying a visual characteristic of the extracted image data.

8. The image processing method according to claim 7, wherein, a process of generating the document data generates document data representing a document which contains the graphics area, the character string and the text.

9. The image processing method according to claim 7, wherein, a process of generating the document data generates document data containing information indicating a storage position of the image file.

10. The image processing method according to claim 7, wherein, a process of generating the document data extracts a character string identical to a prescribed character string from among the text, and generates document data representing a document containing the extracted character string.

11. The image processing method according to claim 7 wherein, a process of extracting the graphics area extracts a plurality of graphics areas;

the image processing method further comprises a process of extracting information related to other graphics areas which have relevance to the graphics areas, for each of the plurality of graphics areas; and a process of generating the document data generates document data containing the information.

12. The image processing method according to claim 7, further comprising:

extracting characteristics of the graphics area wherein, a process of generating the document data generates document data containing a character string representing the characteristics.

13. The image processing device according to claim 1, further comprising:

a format association table that associates a file representing the graphics area with a character string related to the graphics area, wherein the format association table contains a file name of the file representing the graphics area, with at least one of the character string indicating a title of the graphics area, the character string describing the graphics area, and the character string indicating characteristics of the graphics area.

14. An image processing device comprising:

a reading unit that reads a document;

a graphics area extraction unit that extracts a graphics area from the document read by the reading unit, the graphics area being an area containing a graphical image;

a writing area extraction unit that extracts a writing area from the document read by the reading unit;

a character string extraction unit that extracts a character string presented in the graphics area, the character string being located in the graphics area itself or in an area within close proximity to the graphics area;

a text extraction unit that extracts from the writing area, text that includes the same character string as the character string extracted by the character string extraction unit;

a format association unit that associates information of the text with the graphics area; and a document data generation unit that generates document data representing a document containing the graphics area extracted by the graphics area extraction unit and the text extracted by the text extraction unit, wherein the generated document data includes at least one character string identifying a visual characteristic of the extracted graphics area.

15. The image processing device according to claim 14, wherein the format association unit has a table that associates a file representing the graphics area with a character string related to the graphics area.

16. The image processing device according to claim 15, wherein the table contains a file name of the file representing the graphics area, with at least one of the character string indicating a title of the graphics area, the character string describing the graphics area, and the character string indicating characteristics of the graphics area.

17. A image processing device, comprising:

a reading unit that reads a document;

a graphics area extraction unit that extracts a graphics area from the document read by the reading unit, the graphics area being an area containing a graphical image;

a writing area extraction unit that extracts a writing area from the document read by the reading unit;

a character string extraction unit that extracts a character string presented in the a graphics area, the character string being located in the graphics area itself or in an area within close proximity to the graphics area;

an association unit that associates information of the writing area with the graphics area based on the character string extracted by the character string extraction unit; and a document data generation unit that generates document data representing a document containing the graphics area extracted by the graphics area extraction unit, wherein the generated document data includes at least one character string identifying a visual characteristic of the extracted graphics area.

18. A storage medium readable by a computer, the storage medium storing a program of instructions executable by the computer to perform a function for image processing, the function comprising:

reading a document:

generating an image file representing an image of the read document;

extracting a graphics area in the image, the graphics area being an area containing a graphical image;

extracting a writing area in the image;

extracting a character string presented in the graphics area, the character string being located in the graphics area itself or in an area within close proximity to the graphics area;

extracting, from the writing area, text that includes the same character string as the character string extracted in a process of extracting the character string;

associating the text from the writing area with the character string presented in the graphics area; and generating document data representing a document containing the graphics area extracted by the graphics area extraction unit and the text extracted by the text extraction unit by using a document data generation unit, wherein the generated document data includes at least one character string identifying a visual characteristic of the extracted graphics area.

19. The image processing device according to claim 1, wherein:

the graphics area extraction unit further extracts an other graphics area in the image represented by the image file;

the character string extraction unit further extracts an other character string present in the other graphics area; and if the character string and the other character string have an identical part, the document data generation unit generates document data representing a document containing the graphics area, the text extracted by the text extraction unit, and the other graphics area.

20. The image processing method according to claim 7, further comprising:

extracting an other graphics area in the image represented by the image file; and extracting an other character string present in the other graphics area, wherein if the character string and the other character string have an identical part, the process of generating document data generates document data representing a document containing the graphics area, the text, and the other graphics area.

21. The image processing device according to claim 14, wherein:

the graphics area extraction unit further extracts an other graphics area from the document read by the reading unit;

the character string extraction unit further extracts an other character string present in the other graphics area; and if the character string and the other character string have an identical part, the document data generation unit generates document data representing a document containing the graphics area, the text extracted by the text extraction unit, and the other graphics area.

22. The image processing device according to claim 17, further comprising a text extraction unit that extracts from the writing area, text that includes the same character string as the character string extracted by the character string extraction unit, wherein:

the graphics area extraction unit further extracts an other graphics area from the document read by the reading unit;

the character string extraction unit further extracts an other character string present in the other graphics area; and if the character string and the other character string have an identical part, the document data generation unit generates document data representing a document containing the graphics area, the text extracted by the text extraction unit, and the other graphics area.

23. The function according to claim 18, further comprising:

extracting an other graphics area in the image represented by the image file; and extracting an other character string present in the other graphics area, wherein if the character string and the other character string have an identical part, the process of generating document data generates document data representing a document containing the graphics area, the text, and the other graphics area.

* * * * *